United States Patent [19]
Schulman et al.

[11] Patent Number: 6,060,835
[45] Date of Patent: May 9, 2000

[54] LIGHTING DEVICE FOR ENCLOSED AREAS

[75] Inventors: Alan M Schulman, Highland Park, Ill.; James W. Oram, Charlotte, N.C.

[73] Assignee: Glentronics, Inc., Glenview, Ill.

[21] Appl. No.: 08/996,077

[22] Filed: Dec. 22, 1997

[51] Int. Cl.[7] .................................................. B60Q 7/00
[52] U.S. Cl. ...................... 315/84; 315/360; 312/249.11; 362/155
[58] Field of Search ..................... 315/360, 159, 315/84; 362/157, 295, 802, 155, 276; 312/249.4, 249.11, 330.1, 223.5; 340/570

[56] References Cited

U.S. PATENT DOCUMENTS

| | | | |
|---|---|---|---|
| 4,384,751 | 5/1983 | Guntermann et al. | 312/265.4 |
| 4,502,035 | 2/1985 | Obenauf et al. | 340/323 R |
| 5,018,057 | 5/1991 | Biggs et al. | 362/295 |
| 5,246,286 | 9/1993 | Redburn et al. | 312/223.5 |
| 5,621,922 | 4/1997 | Rush, III | 2/422 |

Primary Examiner—Haissa Philogene
Attorney, Agent, or Firm—Arnold White & Durkee

[57] ABSTRACT

An activation device for supplying an electrical signal to a lamp in response to an outside force comprising a hollow tube, a ball placed within the hollow tube, the ball of a diameter less than the diameter of said hollow tube, a piezo device including a piezo bender coupled to an end of the hollow tube, wherein the outside force produces movement of the ball such that the ball traverses the tube to strike the piezo bender thereby producing an electrical signal; and means for using said electrical signal to activate the lamp.

16 Claims, 7 Drawing Sheets

CIRCUIT BLOCK DIAGRAM

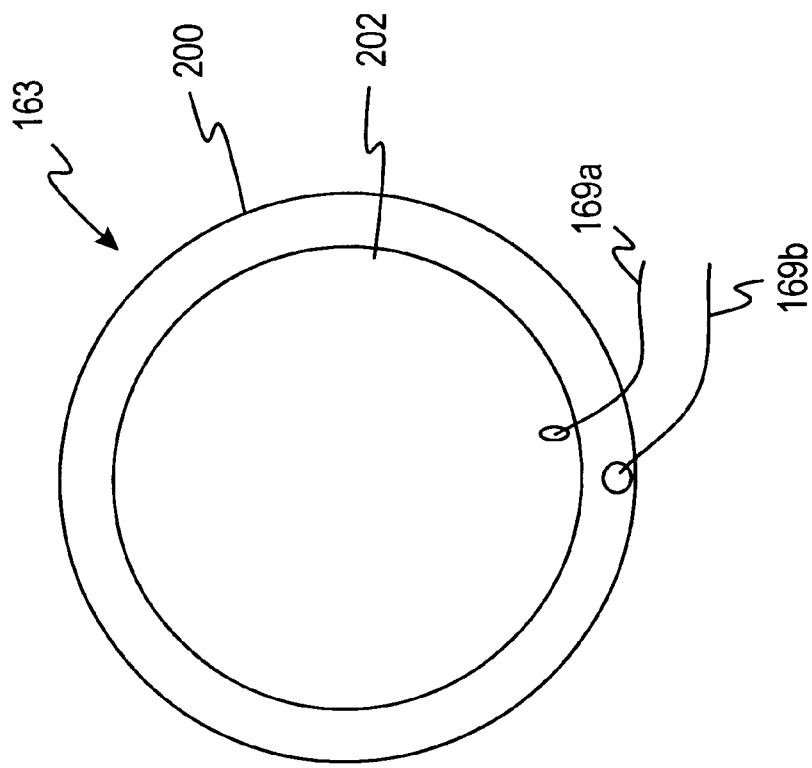
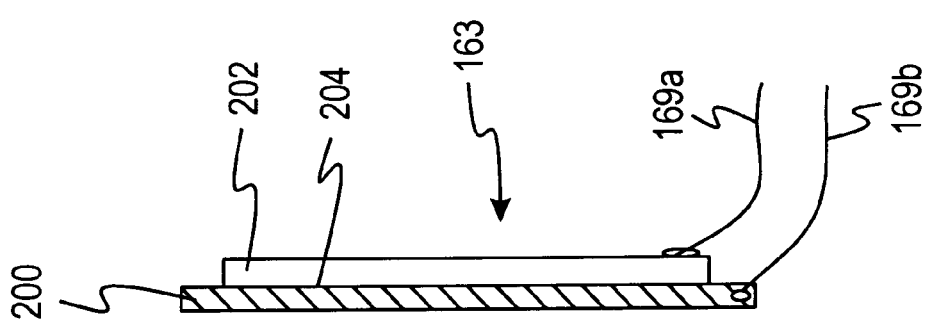

LIGHTING DEVICE FOR ENCLOSED AREAS

FIELD OF THE INVENTION

The present invention relates to an electromechanical device which uses a circuit to convert the physical movement of an object into electrical impulse without wasting battery electricity to monitor the circuit.

SUMMARY OF THE INVENTION

An object of the present invention is to utilize the energy expended during the physical movement of an object to turn on a lamp.

Still another object of the invention is to operate a circuit in an "on cycle" when physical movement of the object is present and to operate the circuit in an "off cycle" via the lack of physical movement of the object.

Another important object of the present invention is to provide a circuit whereby no power is used to monitor the circuit when the circuit is in the off condition.

Yet another object of the present invention is to provide an easy-to-use lighting device for use in illuminating dark areas.

Another object of the present invention is to provide a lighting device which, when mounted in a stationary position, can be used to temporarily illuminate an area.

A further object of the present invention is to provide a device with a momentary switch mounted in the unit, the activation of this switch starting the turn-on circuit.

Still another object of the invention is to provide a lighting circuit which provides adequate amounts of light to properly observe and select the desired color or size of the item.

Another object of the invention is to provide a device which emits a proper color of light such that objects can be observed and their color can be determined when illuminated with this proper color of light.

Yet another object of the present invention is to provide a circuit which enables the user to have a battery-powered light attached to the inside of a drawer ready to turn on when the drawer is opened.

Still another object of the invention is to provide a device whereby the energy imparted to the drawer causes the light to activate, thus supplying the light needed to select the desired item.

Another object of the invention is to provide a device where, if no further movement is detected, an automatic timer circuit deactivates the lighting device.

Yet another object of the present invention is to provide a turn-on circuit capable of being activated by a pulse from a momentary switch that is included in the unit.

Still another object of the present invention is to provide a lighting system that can be activated automatically and manually.

For the purpose of providing a lighting system for an enclosed area, a lighting system is provided comprising lighting means for lighting an enclosed area, ball accelerometer means for generating an electrical signal in response to an external force, a pulse amplifier coupled to said ball accelerometer means, said pulse amplifier increasing the magnitude of said electrical signal, timing means coupled to said pulse amplifier and said timing means for producing an activation signal in response to said electrical signal, said timing means determining the period of activation of said lighting means, and driver means coupled to said timing means and said lighting means for supplying energy to said lighting means in response to said activation signal.

DETAILED DESCRIPTION OF THE DRAWINGS

FIGS. 7a and 7b are views of the piezo electric device according to principles of the present invention.

DESCRIPTION OF THE PREFERRED EMBODIMENTS

There are many environments where there is an inadequate amount of light available to adequately observe various objects. One of these locations is a drawer full of different colored articles of clothing, for example, socks. The embodiments of the invention which follow describe the invention as used in a drawer to illuminate articles of clothing. However, although this description relates to the lighting of a drawer of different colored articles of clothing, it will be understood that the principles described herein are applicable to lighting any type of object or objects in any area or in any location.

It is usually dark in morning hours when many people choose their wardrobe for the day. When it is time to select, for example, matching colored socks or other clothing items, the lack of adequate light can cause the selection of mismatched items. A room-illuminating lamp could be used for the purpose of illuminating the items in the drawer. However, while turning on a room-sized lamp can provide the light needed, that light could disturb others in that room. As will be explained in greater detail below, the present invention, using a zero power ball accelerometer and lighting circuit, automatically turns on a lamp inside the drawer to provide the needed light for a predetermined period of time and then automatically turns off that lamp. The lamp also omits light with a proper color such that objects can be observed and their proper color determined.

Figure 1:
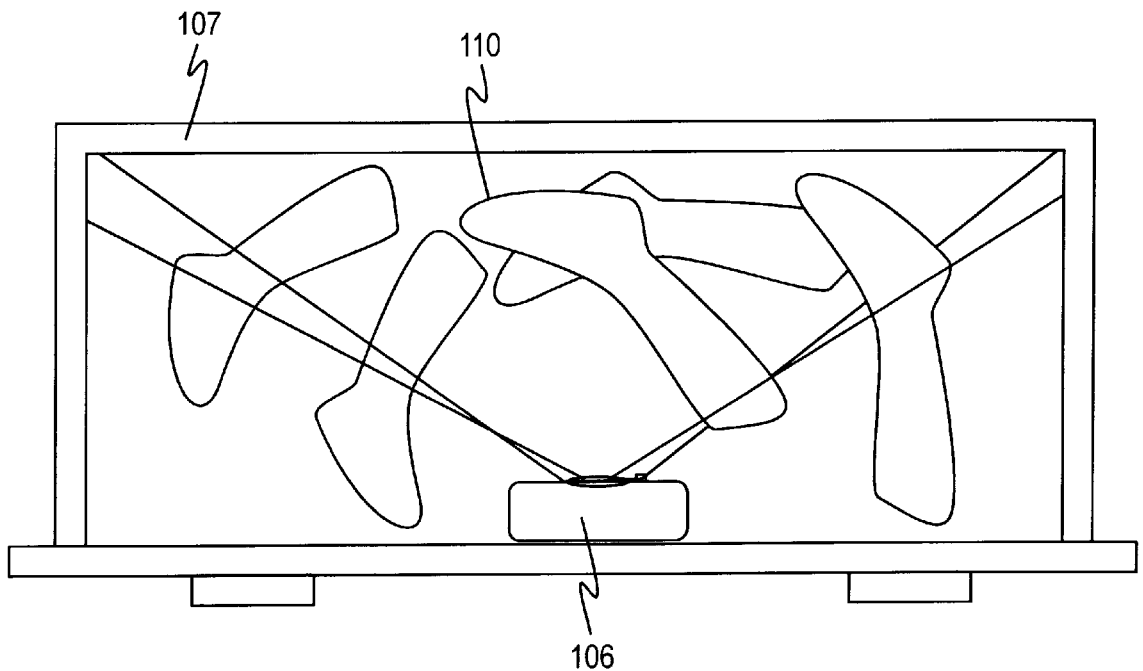
FIG. 1 is a top view of a light in a drawer according to principles of the present invention.

Referring now to FIG. 1, a housing 106 (containing the zero power ball accelerometer and the lighting circuit) is mounted to the inside surface 102 of a drawer 107. The housing 106 is also coupled to a lamp 104 which provides light to illuminate articles of clothing 110.

"Color temperature" refers to having an ideal black body (which is heated) emitting light of the same color and chromatic properties as the light being measured and assumes that the light source has a continuous spectral power distribution. For example, a candle light has a color temperature of 1500 K degrees; a 40 watt bulb, 2500 K; a 100 watt bulb, 3100 K; a quartz halogen source, 3000 K, a warm white fluorescent bulb, 3300 K; a white fluorescent bulb, 3500 K; a cool white fluorescent source, 4350 K; the summer sun, from 5000 K to 8000 K; and the northern blue sky, 8500 K. The human eye is most sensitive to yellow/green colors and is less sensitive to areas of red and blue. Thus, to accurately view blue socks (as compared to black socks), the color temperature of the lamp must be in the blue color temperature range.

To achieve this result, the color temperature of an incandescent lamp can be moderately overdriven to obtain the desired color temperature without sacrificing the lamp. The lamp is turned on briefly, 30 to 60 seconds, in which the lamp performs its function and then turns off.

The overdrive factor for the lamp is the ratio of the nominal lamp voltage divided into the overdrive voltage. For example, a 7.5 V lamp with an overdrive voltage of 9 volts, has an overdrive factor of 1.2. It is well known that a small increase in the voltage on the lamp over the nominal voltage value will dramatically increase the spectral output and color temperature of the lamp. For example, a #50 lamp which nominally runs at around 3500 K can be momentarily increased to over 5000 K by the application of the over voltage. This gives the lamp of the present invention the illumination necessary for a person to distinguish between, for example, blue and black socks. Of course, as the stored energy of the battery depletes over time, the color output of the lamp diminishes. This fact can be used by a person to determine that the battery should be replaced. Thus, the lamp 104 is overdriven to provide light of a proper color such that the color of the articles of clothing in the drawer and the sizes and other characteristics of the clothing in the drawer can easily and properly be determined.

When the user opens the drawer 107, the housing 106 and lamp 104 are thrust outwards. This outward action of the drawer 107 activates the zero power ball accelerometer (in the housing 106) which activates a lighting circuit (also in the housing 106) which, in turn, activates the lamp 104. The lighting circuit also deactivates the lamp 104 after waiting for a predetermined amount of time. The zero power ball accelerometer and the lighting circuit are described in greater detail below.

Figure 2:
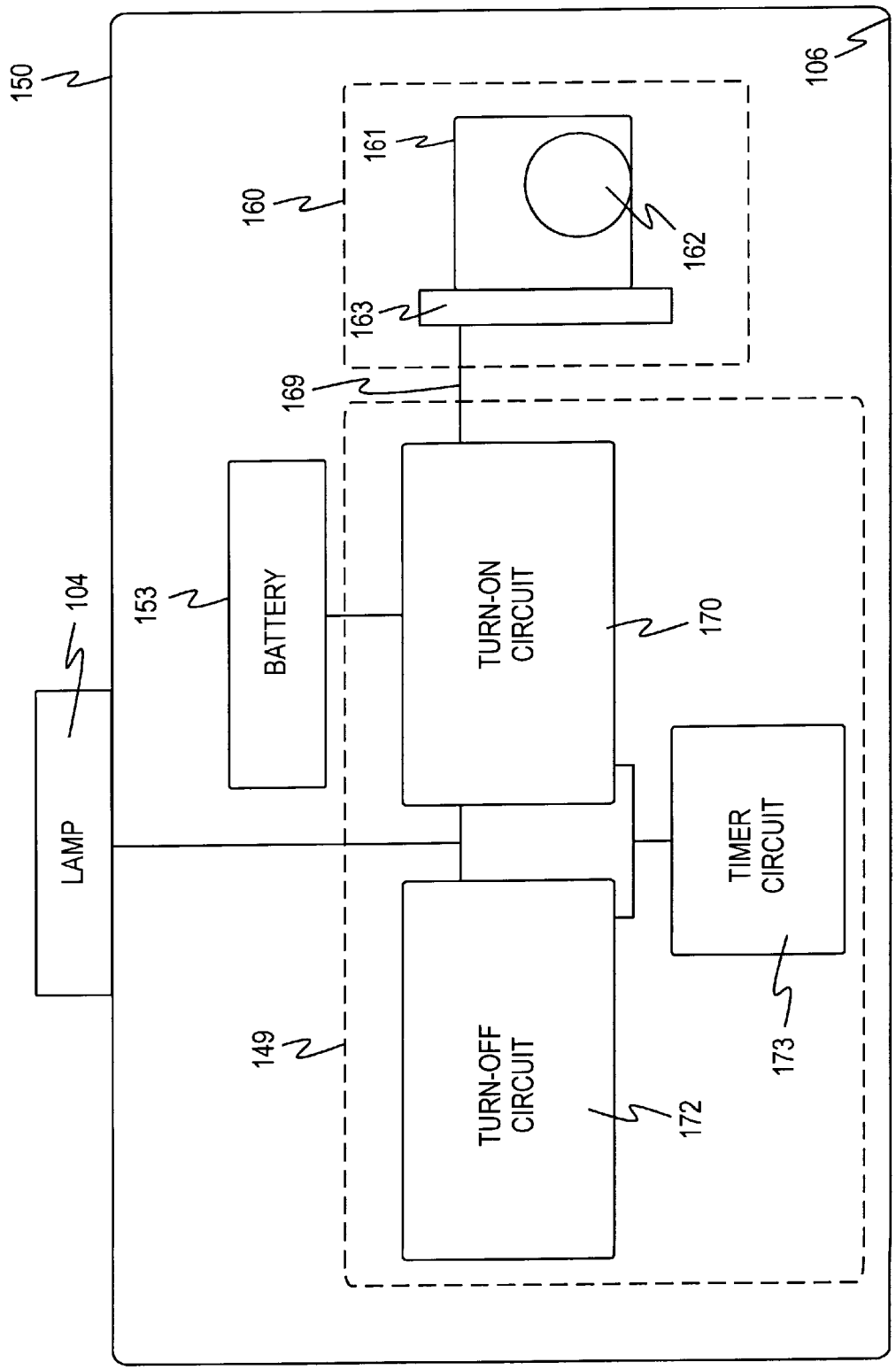
FIG. 2 is a block diagram of the elements of the lighting circuit according to principles of the present invention.

Referring now to FIG. 2, a block diagram of a lighting circuit 150 in the housing 106 is illustrated. A dry cell battery 153, with a limited amount of available energy, is used for an energy source. The battery 153 is coupled to a turn-on circuit that detects any movement in the housing 106.

It is an important feature of the present invention that the lighting circuit 150 consumes no energy when stationary. In other words, the lighting circuit 150 consumes no energy when the housing (containing the circuit) is at rest. If the circuit 150 constantly used energy to monitor movement, the battery 153 would rapidly discharge. Users would need to frequently replace the battery which would be both time-consuming and expensive.

A zero power ball accelerometer 160 is used in the present invention to activate the lighting circuit 150. In the present invention, the movement of the drawer (and resultant force produced) accelerates a ball 162 which is held in a hollow tube 161. The ball 162 is preferably in the form of a small glass ball. Of course, balls of other materials can be also used as known to those skilled in the art. This applied force is transformed into kinetic energy (of the ball), which is imparted to a piezo device 163. Specifically, energy, from the flexing impact of the small ball, is imparted to the thin, polarized piezo device 163.

The piezo device 163 is used as an electrical signal generator whereby mechanical excitation (motion and force) leads to an electrical response (voltage and current). When the piezo-ceramic device is forced to flex, one layer of the device will be in tension while the other layer of the device will be in compression. The stresses in each layer produce electrical outputs which will be the summation of the outputs in each layer.

Piezo devices exhibit extremely high sensitivities, in the order of fifty times that of wire strain gauges and are small enough that on most structures they will not materially affect the vibrational characteristics of the structure. Because some atomic lattice structures have as an essential unit (or "cell") a cubic or rhomboid "cage" made of atoms, and this cage holds a single semi-mobile ion which has several stable quantum position states inside the cell. The ion's post ion state can be caused to shift by either deforming the cage (applied strain) or by applying an electric field. The coupling between the central ion and the cage provides the basis for transformation of mechanical strain to internal electric field shifts and vice versa.

The piezoelectric property of ceramics does not arise simply from its chemical composition. In addition to having the proper formulation, the piezo-ceramics must be subjected to a high electric field for a short period of time to force the randomly oriented micro-dipoles into alignment. This alignment by application of high voltage is called "poling". At a later time, if an electric field is applied in the opposite direction, it exerts a "dislodging stress" on the micro-dipoles. Low level applied fields result in no permanent change in the polarization (it bounces back upon removal). Medium fields result in partial degradation of a polarization (with partial loss of properties). High level applied fields result in repolarization in the opposite direction.

Young's modulus (Y), a material property of all elastic solids, is used to describe "stiffness" of materials. When rod or plate of cross section (A) and length (L) is pulled with force (F) resulting in an elongation (delta L), the Young's modulus can be computed as follows:

$$Y=(L/A)*(F/\text{delta}F)$$

In piezo applications, Y is frequently used to estimate the equivalent spring constant of a rod or a plate of material (i.e. that quantity (F/deltaF) that is in contact with a piezo actuator). The output of the piezo device thus responds with an electrical pulse proportional to the applied energy that flexes the piezo material.

Referring now to FIGS. 7a and 7b, the piezo device 163 comprises a thin metallic base 200 which holds a piezo crystal wafer 202. A bonding area 204 is an area installed at the time of manufacture. Wires 169 connect the piezo device 163 to the turn-on circuit. As shown, one of the wires 169a is soldered to the piezo crystal wafer 202 while the other wire 169b is soldered to metallic base 200.

The piezo device 163 is flexed by the impact and produces an electrical impulse proportional to the force of the impact. This impulse is then used to activate the turn-on circuit 170. While this process is executing, no power is consumed from the primary battery 153. Wires 169 connect the piezo device 163 to the turn-on circuit 170.

Energy is thus extracted from the act of moving the device or opening the drawer. The user applies the energy when they open the drawer. This action applies a certain amount of energy to the glass ball which is set into motion.

When the drawer is fully open and drawer movement stops, the ball 162 strikes the piezo device 163. The impact removes the stored kinetic energy from the moving ball 162. The piezo device 163 converts this force into an electrical impulse that triggers a turn-on circuit 170 into conduction. This conduction activates a lamp 104. The lamp 104 illuminates the articles of clothing placed in the drawer.

It is desirable that the light illuminate the drawer for only a certain limited amount of time. This limited illumination time reduces the drain of energy from the battery and is practical because a user typically will spend a small amount of time searching for articles of clothing in the drawer. After a period of time, a timer circuit 173 activates a turn-off circuit 172 which shuts down the lamp 104. Alternatively, the timer circuit 173 may be included as part of the turn-on circuit as described below. The turnoff circuit 172 consumes no additional power when inactive.

Figure 3A:
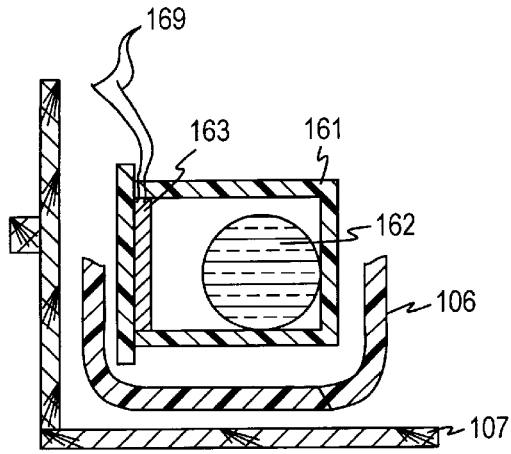
FIG. 3a is a cutaway view of the zero power ball accelerometer activation cylinder with the activation ball at rest according to principles of the present invention.

Turning now to FIG. 3a, there is shown yet another embodiment of the zero power ball accelerometer and lighting circuit of the present invention. As shown in FIG. 3a, a ball 162 is positioned inside of a hollow cylinder 161. The hollow cylinder 161 is larger than the ball 162 to allow the ball to roll freely when there is any movement of the housing.

Figure 3B:
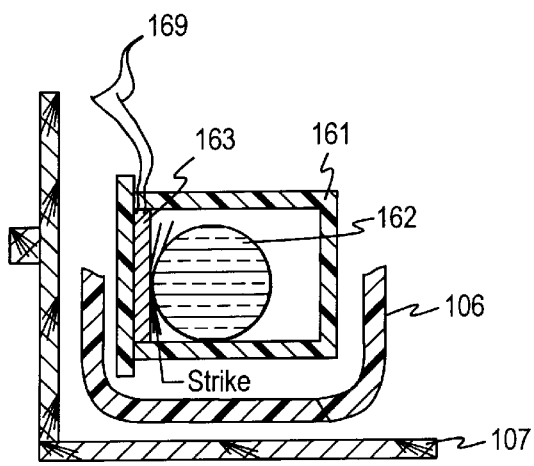
FIG. 3b is a cutaway view of the zero power ball accelerator activation cylinder with the ball moving, due to the movement of the housing which applies energy to the ball according to principles of the present invention.
Figure 3C:
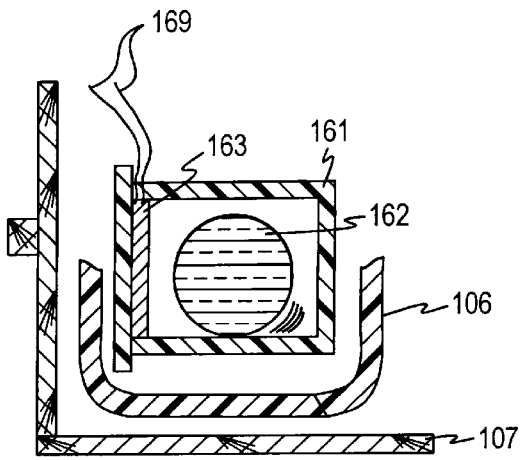
FIG. 3c is a cutaway view of the zero power ball accelerometer activation cylinder with the ball striking the piezo bender, thus transferring the kinetic energy from the ball to the piezo bender according to principles of the present invention.

Referring now to FIG. 3b, when the drawer 107 is opened, the housing 106 is thrust backwards. This action transfers kinetic energy to the ball 162, which, as shown in FIG. 3b, begins to roll within the hollow cylinder 161. FIG. 3c illustrates when the drawer 107 stops, the inertia of the now moving ball 162 continues its movement and strikes the piezo bender 163. The piezo bender 163 then converts the mechanical kinetic energy stored in the moving ball 162 into electrical energy.

Figure 4:
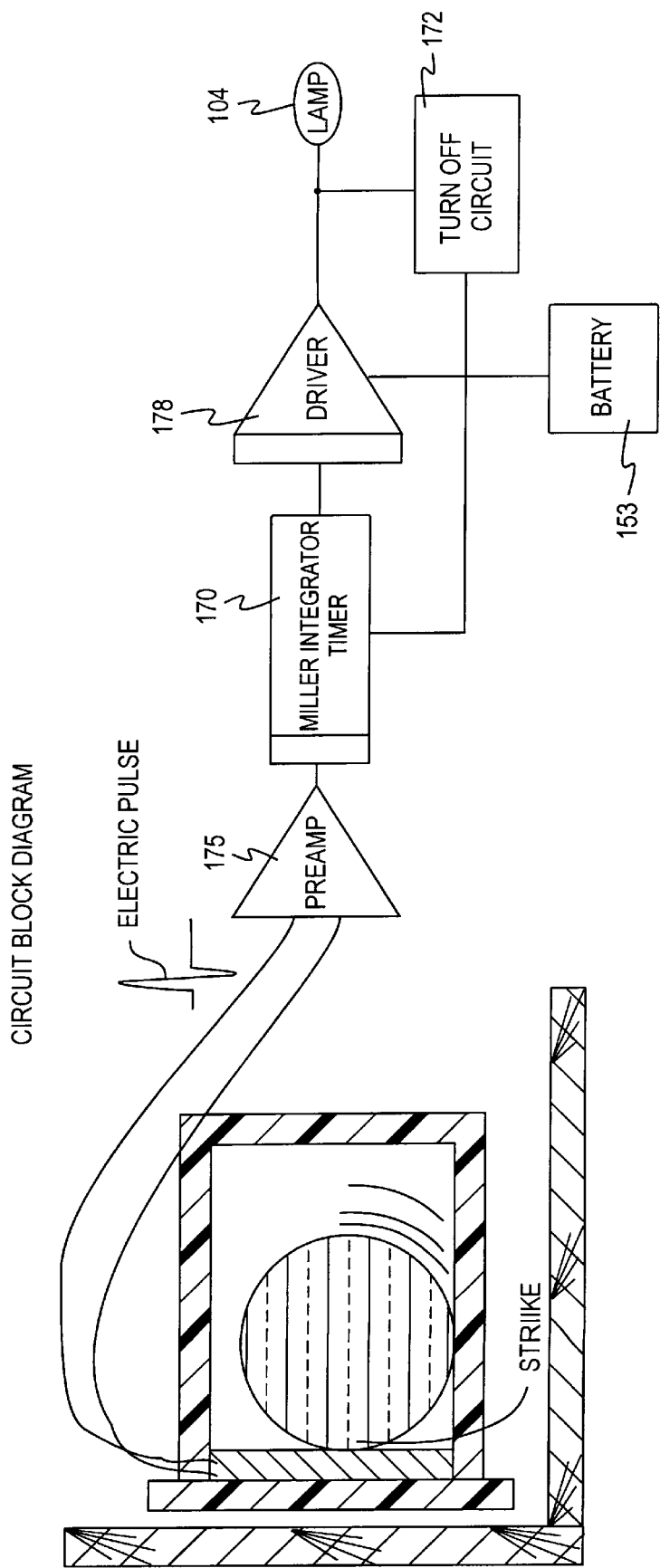
FIG. 4 is another diagram of the zero power ball accelerometer and lighting circuit according to principles of the present invention.

Referring to FIG. 4, this electrical energy is then transferred to a pulse amplifier 175 which amplifies the signal to a level that is usable to the turn-on circuit 170, which utilizes the electrical signal to activate the driver circuit 178 which then activates the lamp 104 for a predetermined amount of time that is governed by the turn-on circuit 170. With no further movement, the timer circuit 170 activates the turn-off circuit 172 which turns off the light. In this application, when the drawer 107 is closed, the previously mentioned functions are repeated and upon completion, the lamp 104 turns off, thus disconnecting the circuit from the battery 153. A standard 9-volt battery, for example, can be used as the battery and is connected to the circuit as a lamp power source. The turn-on circuit, timer circuit, and turn-off circuit can be constructed in separate, modular circuits (as described above). Alternatively, they can be constructed as a single physical circuit as described below. In either case, the circuit elements used will be the same.

Figure 5:
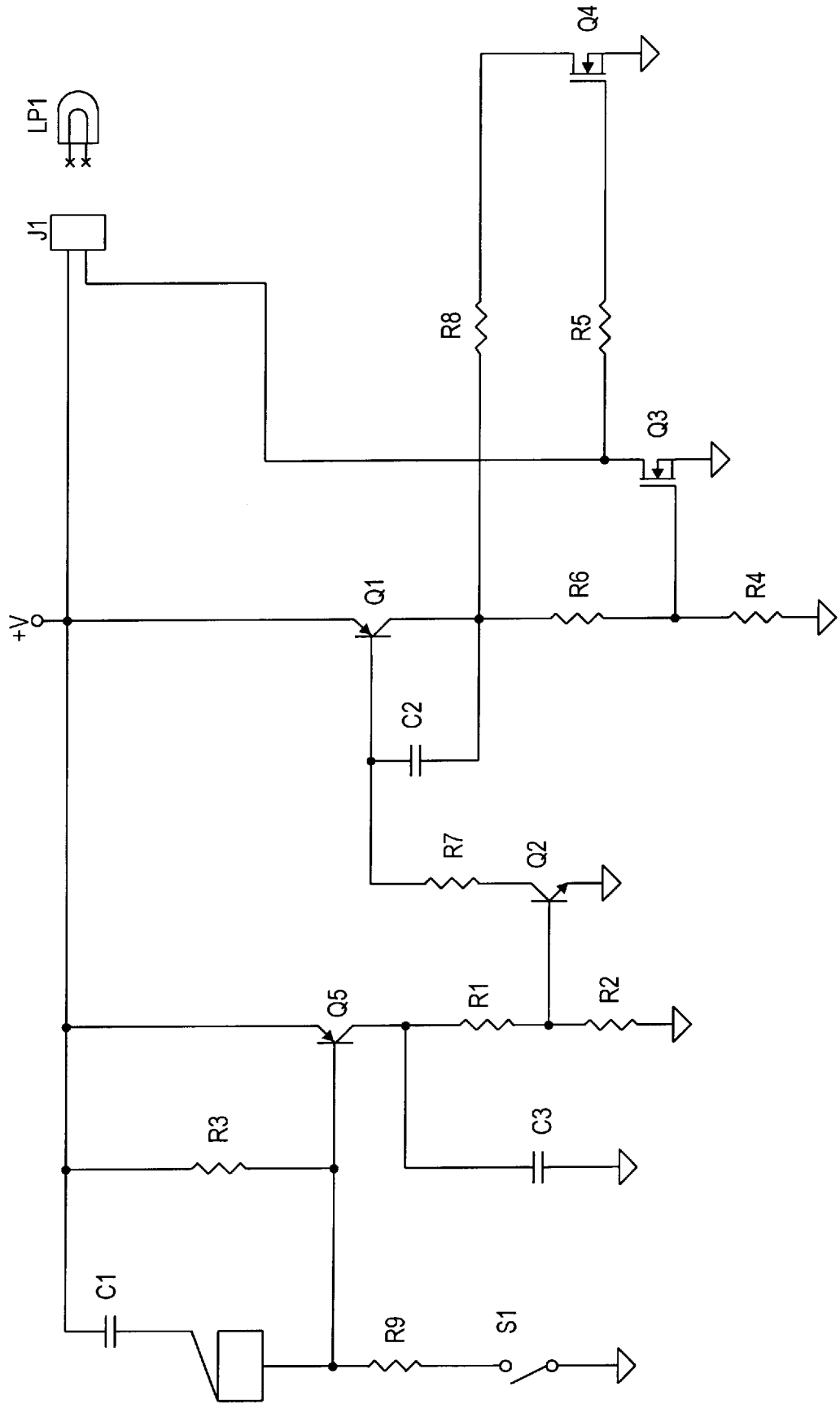
FIG. 5 is a circuit diagram of the turn-on and timer circuit according to principles of the present invention.

The operation of the lighting control circuit (with a turn-on circuit, turn-off circuit, and timer) is now described in reference to FIG. 5. Given the initial condition of the glass ball at rest, the user opens a drawer that imparts a small part of this opening energy to the glass ball which sets the ball in motion. The glass ball (by Newton's law) desires to remain in motion until the ball encounters an opposite force, namely the piezo device. The impact of the glass ball against the piezo device causes an energy transfer to occur. The transferred energy, via the piezo device, is transformed into an electrical voltage impulse that is then used by the lighting circuit to activate the lamp within the drawer.

The electrical impulse is applied to the base of a transistor Q3 which acts as a preamplifier. The amplified output of Q3's collector is applied though a resistor R2 to the base (pin 2) of a transistor Q4. The transistor Q4 is the driver for a Miller integrator circuit 200 comprising a transistor Q1, a capacitor C1 and a resistor R5. This circuit 200 uses the integration of the capacitance value of C1 which is multiplied by the gain of the transistor Q1 to achieve long time durations of 30 up to 60 seconds using only a small low cost capacitor for C1. This reduces cost and reduces size. Otherwise, a much larger capacitor must be used to achieve the long time delays necessary for the present invention.

The amplified driver impulse is then applied to the base of a transistor Q1 which causes the collector of Q1 to pull up to +V very quickly. +V is the supply voltage and is typically 9 volts DC. In the process, the capacitor C1 is charged and the GATE of a MOSFET Q2 is pulled high turning it on. As a result, the drain of MOSFET Q2 is thus pulled low thereby turning off Q5 and turning Q2 on and the lamp once the shut-down circuit of Q5 is released.

The low voltage from the drain of Q2 is then applied to the base of a transistor Q5 which releases Q5 from pulling down via a resistor R7. This in effect releases the latching effect allowing the lamp driving circuit Q2 to turn on the lamp.

Q5 is the "shut-down" transistor which causes the circuit to shut down smoothly and hold itself in the OFF state. When the lamp is off, this is the latched OFF state resulting in "zero power consumption". The two transistors Q2 and Q5 with resistors R5, R6, R7 and R8 with C1 and Q1 act as a monostable where the OFF state is the stable phase. The switch S1 is the manual turn-on switch for the device. In some instances, the invention may be stationary but the user may still desire to activate the lamp. The user merely closes the switch, in this case.

The turn-off phase of the lighting control circuit is now described. As the charge on C1 diminishes through the base of Q1, the GATE voltage of Q2 begins to fall. As the voltage falls, the drain of Q2 begins to turn off and release the lamp LP1. The voltage slowly rises on the GATE of Q5. At a voltage of about 1 volt, the MOSFET Q5 begins to conduct thereby initiating the "shut-down" ramp of the lamp LP1. R7 is now connected to circuit ground through Q5. This accelerates the normal discharge of the C1 capacitor. This results in the lamp LP1 extinguishing in approximately two seconds which is the smooth ramp down of the lamp intensity. A mounting pad or foils J1 is used to attach the socket of the lamp L1.

In one illustrative embodiment of the lighting control circuit, the value of RI was chosen to be 1K ohms, R2 was 220 K ohms, R3 was 3.3M ohms, R4 was 2.2M ohms, R5 was 100 K ohms, R6 was 270 ohms, R7 was 220 ohms, and R8 was 270K ohms. Additionally, the value of C1 was chosen to be 0.047 mili-farads, C2 was 0.1 mili-farads, and C3 was 0.001 mili-farads. Of course, other values of the above components can be used as known to those skilled in the art.

Figure 6:
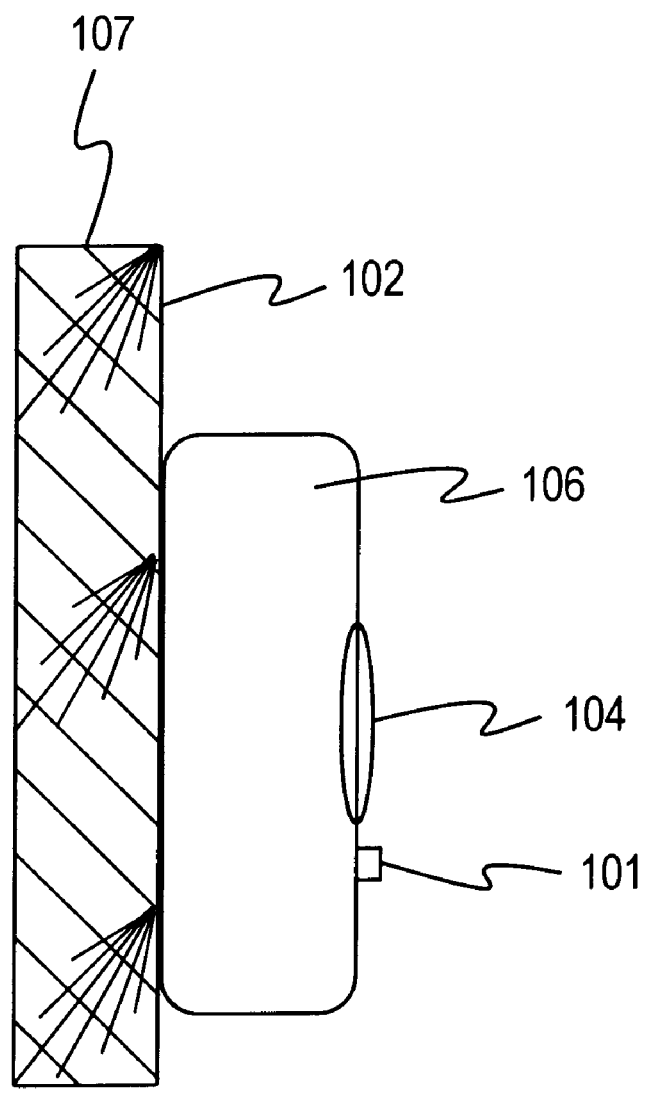
FIG. 6 illustrates other uses for the present invention. In this case a manual depression of the activation button initiates the turn-on and turn-off cycle of the light according to principles of the present invention.

Referring now to FIG. 6, a button 101 can be used to turn the lamp 104 on directly. In this case, the lamp 104 is turned off, as described above, after a predetermined amount of time. The button acts as a switch and, when closed, activates the turn-on circuit directly. In another embodiment, the button can also be used to deactivate the lamp.

While the invention is susceptible to various modifications and alternate forms, specific embodiments thereof have been shown by way of example in the drawings and will herein be described in detail. It should be understood, however, that it is not intended to limit the invention to the particular forms disclosed, but on the contrary, the invention is to cover all modifications, equivalents, and alternatives falling within the spirit and scope of the invention as defined by the appended claims.

What is claimed is:

1. An activation device for supplying an electrical signal to a lamp in response to an outside force, said device comprising:

a hollow tube;

a ball positioned within said hollow tube, said ball of a diameter less than the diameter of said hollow tube and moveable within said hollow tube;

a piezo device including a piezo bender coupled to an end of said hollow tube;

wherein said outside force produces movement of said ball such that said ball traverses said hollow tube to strike said piezo bender thereby producing an electrical signal; and activation means responsive to said electrical signal for activating said lamp.

2. An activation device for supplying an electrical signal to a lamp in response to an outside force, said device comprising:

a hollow tube;

a ball positioned within said hollow tube, said ball of a diameter less than the diameter of said hollow tube and moveable within said hollow tube;

a piezo device including a piezo bender coupled to an end of said hollow tube;

wherein said outside force produces movement of said ball such that said ball traverses said hollow tube to strike said piezo bender thereby producing an electrical signal; and activation means responsive to said electrical signal for activating said lamp said activation means comprising:

a pulse amplifier coupled to said piezo device, said pulse amplifier increasing the magnitude of said electrical signal;

timing means coupled to said pulse amplifier and said timing means for producing an activation signal in response to said electrical signal, said timing means determining the period of activation of said lamp; and driver means coupled to said timing means and said lamp for supplying energy to said lamp in response to said activation signal.

3. The activation device of claim 2 wherein said ball is composed of glass.

4. The activation device of claim 2 further comprising deactivation means coupled to said lamp and for deactivating said lamp after a predetermined amount of time.

5. The activation device of claim 2 wherein said lamp is overdriven to a color temperature range for blue light.

6. An automatic lighting system comprising:

lighting means for lighting an enclosed area;

ball accelerometer means for generating an electrical signal in response to movement of said accelerometer means;

a pulse amplifier coupled to said ball accelerometer means, said pulse amplifier increasing the magnitude of said electrical signal;

activation means coupled to said pulse amplifier for producing an activation signal in response to said electrical signal, said activation means also determining the period of activation of said lighting means; and driver means coupled to said activation means and said lighting means for supplying energy to said lighting means in response to said activation signal.

7. The automatic lighting system of claim 6 wherein said ball accelerometer means includes a ball and a hollow tube, said ball moveable within said tube, and a piezo device coupled to an end of said hollow tube wherein said movement produces movement of said ball such that said ball traverses said tube to strike said piezo device.

8. The automatic lighting system of claim 6 wherein said activation means includes a turn-on circuit, a timer, and a turn-off circuit.

9. The automatic lighting system of claim 6 wherein said system is positioned inside a drawer and said movement is the movement of said drawer.

10. An automatic lighting circuit comprising:

a lamp;

ball accelerometer means for generating an electrical signal in response to an applied external force, said ball accelerometer means comprising a hollow tube, said tube holding a ball, said ball moveable within said tube, wherein said ball is moved by an outside force;

a pulse amplifier coupled to said ball accelerometer means, said pulse amplifier increasing the magnitude of said electrical signal;

timing means coupled to said pulse amplifier for producing an activation signal in response to said electrical signal, said timing means determining the period of activation of said lamp, said timing means also comprising deactivation means for deactivating said timing means after said period of activation;

a driver coupled to said timing means and said lighting means for supplying energy to said lamp in response to said activation signal; and wherein said lighting circuit is positioned within a drawer.

11. The automatic lighting circuit of claim 10 wherein said ball is glass.

12. The automatic lighting circuit of claim 10 wherein said lamp emits light in a predetermined color temperature range.

13. The automatic lighting circuit of claim 12 wherein said range is that of blue light.

14. The automatic lighting circuit of claim 10 further including manual activation means coupled to said lamp for manually activating said lamp.

15. A method for supplying an electrical signal to a lamp in a drawer in response to an outside force, said method comprising the steps of:

supplying a drawer;

supplying a hollow tube in said drawer;

positioning a ball within said hollow tube, said ball of a diameter less than the diameter of said hollow tube and moveable within said hollow tube;

supplying a piezo device including a piezo bender coupled to an end of said hollow tube;

moving said drawer and producing movement of said ball such that said ball traverses said hollow tube to strike said piezo bender thereby producing an electrical signal; and activating said lamp in response to said electrical signal.

16. An automatic lighting circuit comprising:

a lamp;

ball accelerometer means for generating an electrical signal in response to an applied external force, said ball accelerometer means comprising a hollow tube, a glass ball, and a piezo device, said tube holding said glass ball, said tube coupled to said piezo device, said ball moveable within said tube, wherein said ball is moved by an outside force to strike said piezo device;

a pulse amplifier coupled to said ball accelerometer means, said pulse amplifier increasing the magnitude of said electrical signal;

timing means coupled to said pulse amplifier for producing an activation signal in response to said electrical signal, said timing means determining the period of activation of said lamp, said timing means also comprising deactivation means for deactivating said timing means after said period of activation;

a driver coupled to said timing means and said lighting means for supplying energy to said lamp in response to said activation signal;

wherein said lighting circuit is positioned within a drawer;

manual activation means coupled to said lamp for manually activating said lamp; and means for overdriving said lamp such that said lamp emits light in a predetermined color temperature range.

* * * * *